(12) United States Patent
Parker

(10) Patent No.: US 7,401,274 B2
(45) Date of Patent: Jul. 15, 2008

(54) METHOD OF PERFORMING PROGRAMMING AND DIAGNOSTIC FUNCTIONS FOR A MICROCONTROLLER

(75) Inventor: Kevin L. Parker, Pittsburgh, PA (US)

(73) Assignee: Eaton Corporation, Cleveland, OH (US)

(*) Notice: Subject to any disclaimer, the term of this patent is extended or adjusted under 35 U.S.C. 154(b) by 679 days.

(21) Appl. No.: 11/086,539

(22) Filed: Mar. 22, 2005

(65) Prior Publication Data

US 2006/0218531 A1     Sep. 28, 2006

(51) Int. Cl.
    *G01R 31/28*     (2006.01)
(52) U.S. Cl. .................... 714/724; 714/25; 714/30
(58) Field of Classification Search ............... 341/120; 711/103; 700/94; 714/727, 724, 25, 30
    See application file for complete search history.

(56) References Cited

U.S. PATENT DOCUMENTS

| | | | |
|---|---|---|---|
| 4,771,399 A | 9/1988 | Snowden et al. | |
| 5,320,561 A | 6/1994 | Cook et al. | |
| 6,297,757 B1* | 10/2001 | Campbell et al. | 341/120 |
| 6,493,788 B1* | 12/2002 | Sun et al. | 711/103 |
| 6,628,999 B1* | 9/2003 | Klaas et al. | 700/94 |
| 6,842,820 B2* | 1/2005 | Sun et al. | 711/103 |
| 7,076,708 B2* | 7/2006 | Faust et al. | 714/727 |
| 7,219,278 B2* | 5/2007 | Avery et al. | 714/724 |
| 2003/0120860 A1* | 6/2003 | Sun et al. | 711/103 |

* cited by examiner

*Primary Examiner*—David Ton
(74) *Attorney, Agent, or Firm*—Martin J. Moran

(57) ABSTRACT

A method of programming and testing a microcontroller includes providing a connector having a plurality of ports on the circuit board containing the microcontroller, and providing programming data to a first one or more of the ports. Each of the first one or more of the ports is in electronic communication with a respective one of a first one or more of the pins of the microcontroller. The method further includes causing the microcontroller to provide selected diagnostic data on a second one or more of the pins, wherein each of the second one or more of the pins is in electronic communication with a respective one of a second one or more of the ports, receiving the selected diagnostic data from the second one or more of the ports and converting at least a portion of the received selected diagnostic data into one or more analog signals.

13 Claims, 2 Drawing Sheets

METHOD OF PERFORMING PROGRAMMING AND DIAGNOSTIC FUNCTIONS FOR A MICROCONTROLLER

BACKGROUND OF THE INVENTION

1. Field of the Invention

The present invention relates to the programming of microcontrollers, and in particular to a method of utilizing a single connector to perform both programming and diagnostic functions for a microcontroller.

2. Description of the Prior Art

As is known in the art, many current devices are controlled internally by a special purpose computer system known as an embedded system. Embedded systems generally use microcontrollers that contain many elements of a computer, such as a central processing unit, memory (RAM and ROM) and I/O, on a single chip or device. Most modern microcontrollers include flash memory, which is a form of non-volatile storage that can be electrically erased and reprogrammed so that software for the microcontroller can be readily stored, booted, and rewritten as necessary. One advantage of flash memory is that it can be erased and reprogrammed at signal levels normally found inside the microcontroller, and therefore flash memory can be reprogrammed without removing the microcontroller from the device of which it is a part (so called "in-circuit" reprogramming).

Generally, embedded system development involves two basic functional steps, namely a programming step wherein software to be executed by the microcontroller for controlling various aspects of the device in question is written and loaded into the flash memory, and a diagnostic step wherein the functionality of the loaded software is evaluated and tested. Furthermore, these steps are typically repeated iteratively a number of times until the desired level of functionality of the system is achieved.

As is known, microcontrollers include a number of pins for making electrical connections thereto. The programming of a microcontroller is normally facilitated by way of a connector that is provided on the circuit board containing the microcontroller. The connector has, at one end, a number of pins having leads connected thereto. The leads are in turn connected to the various pins of the microcontroller. At the opposite end, the connector has a number of ports, each port being connected to a respective one of the pins. The ports enable external connections to be made to the connecter (and ultimately the pins of the microcontroller through the leads connected to the connector), such as connections from a microcontroller programming tool, a number of which are known and commercially available.

Diagnostic functions, on the other hand, are currently typically performed through the use of one or more external "daughter" boards that implement the diagnostic functionality. This approach, while effective, is disadvantageous, as it requires one or more additional connectors to be added to the circuit board containing the microcontroller to interface with the external "daughter" board or boards. These additional connectors add expense and occupy valuable circuit board space.

SUMMARY OF THE INVENTION

The present invention relates to a method of programming and testing a microcontroller that utilizes a single connector for both programming and diagnostic functions. The microcontroller is provided on a circuit board and has a plurality of pins. The method includes providing a connector having a plurality of ports on the circuit board, and providing programming data used for programming the microcontroller to a first one or more of the ports. Each of the first one or more of the ports is in electronic communication with a respective one of a first one or more of the pins such that the programming data is provided to the microcontroller. The method further includes causing the microcontroller to provide selected diagnostic data on a second one or more of the pins, wherein each of the second one or more of the pins is in electronic communication with a respective one of a second one or more of the ports, receiving the selected diagnostic data from the second one or more of the ports and converting at least a portion of the received selected diagnostic data into one or more analog signals. Preferably, the receiving step comprises receiving the selected diagnostic data from the second one or more of the ports at a digital-to-analog converter, which converts the selected diagnostic data into analog form. The method also preferably includes outputting the one or more analog signals, such as with a display or printer, so that they may be analyzed by a developer.

In one embodiment, the ports and pins associated with the programming related data are different than the ports and pins associated with the diagnostic related data. In another embodiment, one or more of the ports and pins associated with the programming related data are the same as one or more of the ports and pins associated with the diagnostic related data. The programming data may include one or more of program code data, clock data, programming and power voltages and/or ground signals in various combinations. In addition, the diagnostic data may include one or more of selected data relating to operation of said microcontroller, clock data, chip select data, and power and ground signals in various combinations. Finally, the method may further include causing the microcontroller to provide selected digital operational data on other pins and ports for analysis by a developer.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
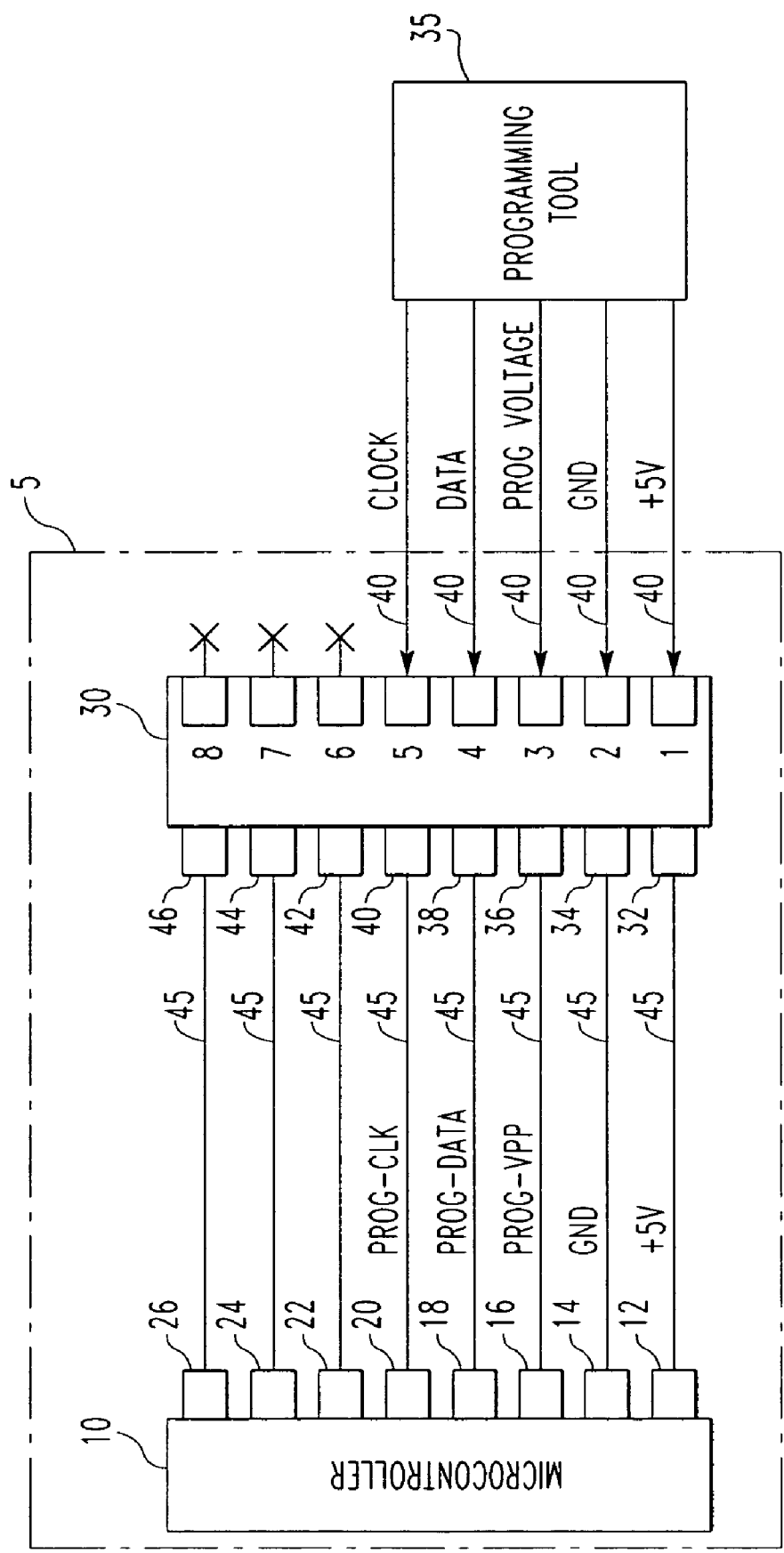
FIG. 1 is a schematic diagram of a configuration for operating in a programming mode according to the present invention in which software may be programmed into a microcontroller.
Figure 2:
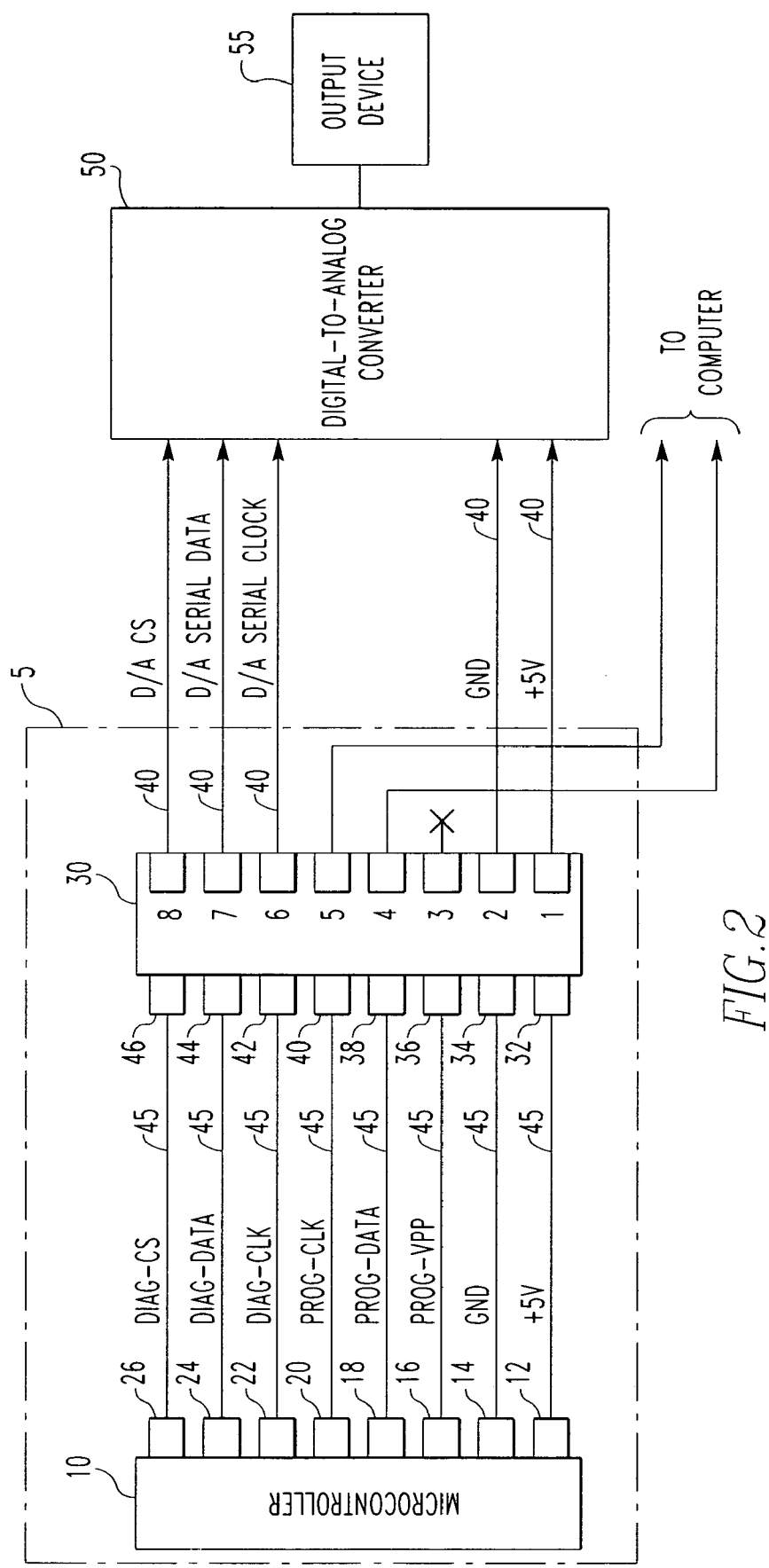
FIG. 2 is a schematic diagram of a configuration for operating in a diagnostic mode according to the present invention in which software programmed into a microcontroller may be evaluated and tested.

FIGS. 1 and 2 are schematic diagrams of a system implementing the method of performing programming and diagnostic functions for a microcontroller according to the present invention. FIG. 1 illustrates a configuration for operating in a programming mode according to the present invention, and FIG. 2 illustrates a configuration for operating in a diagnostic mode according to the present invention.

As seen in FIG. 1, a circuit board 5 is provided that includes a microcontroller 10, which may be any type of microcontroller such as, for example, a microcontroller from the PICmicro® family of microcontrollers sold by Microchip Technology Inc. of Chandler Arizona. Microcontroller 10 includes a number of pins, including pins 12, 14, 16, 18, 20, 22, 24 and 26 which are shown in FIG. 1. Circuit board 5 also includes connector 30 having a number of I/O ports numbered 1 through 8 in FIG. 1 and a number of pins 32, 34, 36, 38, 40, 42, 44 and 46, each electrically connected to a respective one of the ports 1 through 8. As will be appreciated, in the case of each port 1 through 8 and corresponding pin 32 through 46, a first lead or wire may be electrically connected to the port and a corresponding lead or wire may be electrically connected to the corresponding pin such that the two leads or wires are electrically connected to one another. Connector 30 may be any type of known on-board electrical connector, such as, without limitation, an 8-pin type FH21 connector sold by Hirose Electric, a Japanese company with United States headquarters located in Simi Valley, Calif.

A programming tool 35, such as, without limitation, the MPLab PM3 Universal Device Programmer sold by Microchip Technology Inc. of Chandler Arizona, is also provided as seen in FIG. 2. Programming tool 35 is adapted to be connected to various pins of the microcontroller 10 through connector 30 as described below for purposes of programming microcontroller 10, i.e., loading it with desired software, while microcontroller 10 is connected to circuit board 5.

Pin 12 of microcontroller 10 is adapted to receive a supply voltage (+5V) for powering microcontroller 10, pin 14 of microcontroller 10 is adapted to receive a ground signal, pin 16 (Prog-VPP) of microcontroller 10 is adapted to receive a voltage required for programming microcontroller 10, pin 18 (Prog-Data) of microcontroller 10 is adapted to receive the serial data used for programming microcontroller 10 (program code data), and pin 20 (Prog-CLK) of microcontroller 10 is adapted to receive a clock signal used for programming microcontroller 10. As seen in FIG. 1, the signals (+5V power supply, ground, programming voltage, serial programming code data and clock) for pins 12, 14, 16 18 and 20 are provided by programming tool 35 through ports 1, 2, 3, 4, and 5 of connector 30, respectively, by way of wires 40 that connect output ports of programming tool 35 to ports 1 through 5 and by way of leads 45 that connect pins 32, 34, 36, 38 and 40 of connector 30 to pins 12, 14, 16, 18 and 20 of microcontroller 10. Thus, the configuration shown in FIG. 1 may be used to selectively program microcontroller 10 "in circuit."

Pins 22, 24 and 26 of microcontroller 10 are I/O pins provided as part of microcontroller 10, such as serial peripheral interface (SPI) pins, and are connected to pins 42, 44 and 46, respectively, of connector 30 by leads 45. Pins 22, 24 and 26 are not used in the programming mode of the present invention, but instead are used during the diagnostic mode as described below. As a result, as seen in FIG. 1, ports 6, 7 and 8 do not have electrical connections thereto in the programming mode.

FIG. 2 illustrates a configuration for operating in a diagnostic mode according to the present invention in which the software programmed into microcontroller 10 may be evaluated and tested. As seen in FIG. 2, programming tool 35 is no longer used, and instead a digital-to-analog converter 50 such as, without limitation, a 10-bit, 4 channel digital-to-analog converter, is provided. In the configuration of FIG. 2, pin 12 is connected to digital-to-analog converter 50 through pin 32 and port 1 of connector 30 to provide a power supply voltage (from the same source that is powering microcontroller 10) to digital-to-analog converter 50, and pin 14 is connected to digital-to-analog converter 50 through pin 34 and port 2 of connector 30 to provide a ground signal (the same ground signal reference level utilized by microcontroller 10) to digital-to-analog converter 50. In addition, according to an aspect of the present invention, microcontroller 10 is programmed to output through pin 24 selected data of interest relating to the operation of microcontroller 10 (in particular, selected data relating to various aspects of the operational functions that have been programmed into microcontroller 10 during the programming mode shown in FIG. 1) and to output through pin 22 a clock signal. In the embodiment shown in FIG. 2, the selected data is output through pin 24 in a serial manner, but it will be appreciated that this is not required. The data signal from pin 24 is provided to a serial data input port of digital-to-analog converter 50 through pin 44 and port 7 of connector 30 via a lead 45 and a wire 40. Similarly, the clock signal from pin 22 is provided to a serial clock input port of digital-to-analog converter 50 through pin 42 and port 6 of connector 30 via a lead 45 and a wire 40. The microcontroller 10 is programmed to provide the data signal on pin 24 and the clock signal on pin 22 according to the particular serial data protocol of the digital-to-analog converter 50. In the case of a multi-channel digital-to-analog converter 50, the microcontroller 10 may also be programmed to instruct the digital-to-analog converter 50 to output selected portions of the data contained in the data signal provided on pin 24 on particular channels. For example, microcontroller 10 may be programmed to include certain current related data, certain voltage related data, and certain other data from a particular register within microcontroller 10 in the data signal provided on pin 24, in which case microcontroller 10 may be further programmed to instruct the digital-to-analog converter 50 to output the current data on channel 1, the voltage data on channel 2, and the register data on channel 3 of the digital-to-analog converter 50. The serial data protocol of the digital-to-analog converter 50 will enable each type of data in the serial data stream (e.g., the current data, the voltage data, etc.) to be identified with respect to one another. In addition, microcontroller 10 is programmed to output a chip select signal on pin 26, which is provided to the digital-to-analog converter 50 through pin 46 and port 8. The chip select signal indicates to the digital-to-analog converter 50 that serial data is coming from pins 22 and 24.

Once received by the digital-to-analog converter 50, the data is converted to analog form and provided to an output device 55, such as a display or a printer, where it may be viewed by a developer. The analog representation of the data allows a developer to view the values of various registers within microcontroller 10 in real time. As such, the configuration shown in FIG. 2 creates a form of virtual oscilloscope that may be used for microcontroller software development.

As seen in FIG. 2, a signal from pin 16 of microcontroller 10 is not used during the diagnostic mode, and thus port 3 of connector 30 does not have an electrical connection thereto. In addition, in the embodiment shown in FIG. 2, pins 18 and 20 of microcontroller 10, normally used for receiving programming data and clock data during the programming mode, are not used to send data to digital-to-analog converter 50. Thus, according to an aspect of the present invention, microcontroller 10 may be further programmed to output particular additional data or pins 18 and 20 during the diagnostic mode, which data may be sent to a computer for analysis through pins 35 and 40 and ports 4 and 5 of connector 30. For example, microcontroller 10 may be programmed to monitor the operation thereof and output a signal or signal on pins 38 and/or 40 when a particular condition, such as a particular current or voltage level, is detected. Alternatively, microcontroller 10 may be programmed to use pins 18 and 20 instead of pins 22 and 24 to output the data and clock signal described above, in which case ports 4 and 5 would be connected to digital-to-analog converter 50 instead of ports 6 and 7.

Thus, the present invention enables a single connector to be used for both the programming of a microcontroller and the subsequent evaluation of the programming (diagnostic mode). As a result, the efficiency of software development for microcontrollers is improved while at the same time reducing the cost associated therewith.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of programming and testing a microcontroller, the microcontroller being provided on a circuit board and having a plurality of pins, the method comprising:
providing a connector on said circuit board, said connector having a plurality of ports;
providing programming data to a first one or more of said ports, said programming data being used for programming said microcontroller, each of said first one or more of said ports being in electronic communication with a respective one of a first one or more of said pins such that said programming data is provided to said microcontroller; and
causing said microcontroller to provide selected diagnostic data on a second one or more of said pins, each of said second one or more of said pins being in electronic communication with a respective one of a second one or more of said ports; and
receiving said selected diagnostic data from said second one or more of said ports and converting at least a portion of the received selected diagnostic data into one or more analog signals.

2. The method according to claim 1, wherein said second one or more of said ports are in electronic communication with a digital-to-analog converter, and wherein said receiving step comprises receiving said selected diagnostic data from said second one or more of said ports at said digital-to-analog converter.

3. The method according to claim 1, further comprising outputting said one or more analog signals.

4. The method according to claim 3, wherein said outputting step comprises displaying said one or more analog signals on a display.

5. The method according to claim 1, wherein said programming data includes program code data and clock data.

6. The method according to claim 1, wherein said diagnostic data includes selected data relating to operation of said microcontroller and clock data.

7. The method according to claim 1, wherein said programming data is program code data, wherein said diagnostic data is selected data relating to operation of said microcontroller, wherein said first one or more of said ports is a first port, said first one or more of said pins is a first pin, said second one or more of said ports is a second port, and said second one or more of said pins is a second pin.

8. The method according to claim 7, wherein said first port and said second port are the same port and said first pin and said second pin are the same pin.

9. The method according to claim 7, wherein said first port and said second port are different ports and said first pin and said second pin are different pins.

10. The method according to claim 1, wherein said programming data is program code data and program clock data, wherein said diagnostic data is selected data relating to operation of said microcontroller and diagnostic clock data, wherein said first one or more of said ports is a first port and a second port, said first one or more of said pins is a first pin in electronic communication with said first port and a second pin in electronic communication with said second port, said second one or more of said ports is a third port and a fourth port, and said second one or more of said pins is a third pin in electronic communication with said third port and a fourth pin in electronic communication with said fourth port, and wherein said program code data is provided to said first port, said program clock data is provided to said second port, said selected data is provided on said third pin, and said diagnostic clock data is provided on said fourth pin.

11. The method according to claim 10, wherein said first port and said third port are the same port, wherein said second port and said fourth port are the same port, wherein said first pin and said third pin are the same pin, and wherein said second pin and said fourth pin are the same pin.

12. The method according to claim 10, wherein said first port and said third port are different ports, wherein said second port and said fourth port are different ports, wherein said first pin and said third pin are different pins, and wherein said second pin and said fourth pin are different pins.

13. The method according to claim 1, further comprising causing said microcontroller to provide selected operational data on a third one or more of said pins, each of said third one or more of said pins being in electronic communication with a respective one of a third one or more of said ports, said operational data comprising digital data relating to one or more operational parameters of said microcontroller.

* * * * *